(12) United States Patent
Goren et al.

(10) Patent No.: US 8,622,304 B2
(45) Date of Patent: Jan. 7, 2014

(54) IMAGING READER AND METHOD WITH COMBINED IMAGE DATA AND SYSTEM DATA

(75) Inventors: David P. Goren, Smithtown, NY (US); Christopher Warren Brock, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 710 days.

(21) Appl. No.: 12/321,953

(22) Filed: Jan. 26, 2009

(65) Prior Publication Data

US 2010/0187315 A1    Jul. 29, 2010

(51) Int. Cl.
*G06K 7/10*    (2006.01)

(52) U.S. Cl.
USPC ............ 235/462.25; 235/462.01; 235/462.41

(58) Field of Classification Search
USPC .......... 235/435, 454, 462.01, 462.09, 462.45, 235/462.11, 462.24, 462.25, 462.41
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,196,938 A | 3/1993 | Blessinger | |
| 5,296,691 A * | 3/1994 | Waldron et al. | 235/462.12 |
| 5,304,786 A | 4/1994 | Pavlidis et al. | |
| 5,378,883 A * | 1/1995 | Batterman et al. | 235/462.21 |
| 5,702,059 A * | 12/1997 | Chu et al. | 235/472.01 |
| 5,703,349 A | 12/1997 | Meyerson et al. | |
| 5,920,061 A * | 7/1999 | Feng | 235/472.01 |
| 5,992,744 A * | 11/1999 | Smith et al. | 235/462.11 |
| 6,123,261 A * | 9/2000 | Roustaei | 235/462.01 |
| 6,144,976 A * | 11/2000 | Silva et al. | 708/100 |
| 7,059,525 B2 * | 6/2006 | Longacre et al. | 235/462.01 |
| 7,070,099 B2 | 7/2006 | Patel | |
| 7,331,523 B2 * | 2/2008 | Meier et al. | 235/462.25 |
| 7,430,682 B2 | 9/2008 | Carlson et al. | |
| 7,494,064 B2 * | 2/2009 | Slutsky et al. | 235/472.01 |

(Continued)

FOREIGN PATENT DOCUMENTS

| | | |
|---|---|---|
| EP | 524029 A2 | 1/1993 |
| WO | 9715024 A1 | 4/1997 |

OTHER PUBLICATIONS

"PXA3xx (88AP3xx) Processor Family vol. III: Graphics and Input Controller Configuration Developers Manual," Marvell®, Doc. No. MV-S301374-03, Rev. 2.0, pp. 179-181 Apr. 6, 2009.

(Continued)

*Primary Examiner* — Daniel Hess
*Assistant Examiner* — Paultep Savusdiphol
(74) *Attorney, Agent, or Firm* — Nong-Qiang Fan

(57) ABSTRACT

An imaging reader for, and a method of, imaging targets, include a solid-state imager supported by the reader and having an array of image sensors for capturing return light from a target over a field of view, and for generating image data corresponding to the target; an application specific integrated circuit (ASIC) operatively connected to the imager via an image data bus over which the image data is transmitted from the imager to the ASIC, and via a system bus over which system data for controlling operation of the reader is transmitted, the ASIC being operative for combining the image data and the system data to form combined data; and a controller operatively connected to the ASIC, for receiving and processing the combined data from the ASIC.

19 Claims, 3 Drawing Sheets

(56) References Cited

U.S. PATENT DOCUMENTS

| | | | |
|---|---|---|---|
| 7,874,485 B2* | 1/2011 | Meier et al. | 235/462.25 |
| 2001/0003346 A1* | 6/2001 | Feng | 235/472.01 |
| 2002/0050518 A1* | 5/2002 | Roustaei | 235/454 |
| 2003/0089775 A1* | 5/2003 | Yeakley et al. | 235/454 |
| 2003/0121981 A1* | 7/2003 | Slutsky et al. | 235/462.45 |
| 2003/0127519 A1* | 7/2003 | Ehrhart et al. | 235/469 |
| 2003/0189664 A1* | 10/2003 | Olsson | 348/365 |
| 2004/0113791 A1* | 6/2004 | Salim et al. | 340/572.3 |
| 2004/0118927 A1 | 6/2004 | Breytman et al. | |
| 2005/0056699 A1* | 3/2005 | Meier et al. | 235/454 |
| 2006/0065727 A1 | 3/2006 | Patel | |
| 2007/0063048 A1* | 3/2007 | Havens et al. | 235/462.46 |
| 2008/0129841 A1 | 6/2008 | Dosluoglu et al. | |
| 2008/0164314 A1* | 7/2008 | Meier et al. | 235/462.1 |
| 2008/0183571 A1* | 7/2008 | Aaron | 705/14 |
| 2008/0296385 A1* | 12/2008 | Vinogradov | 235/462.22 |
| 2009/0027517 A1 | 1/2009 | Jerdev | |
| 2009/0272804 A1* | 11/2009 | Vinogradov et al. | 235/455 |
| 2010/0096462 A1* | 4/2010 | Brock | 235/462.41 |
| 2010/0187315 A1 | 7/2010 | Goren et al. | |
| 2012/0091206 A1 | 4/2012 | Goren | |

OTHER PUBLICATIONS

European Search Report mailed on Jun. 8, 2012 for European Patent Application No. 10150718.4.
Final Office Action mailed on Jun. 19, 2012 in related U.S. Appl. No. 12/905,194, David P. Goren, filed Oct. 15, 2010.
International Search Report and Written Opinion for related Patent Application No. PCT/US2011/053345 mailed on Mar. 19, 2012.
Non Final Office Action mailed on Feb. 17, 2012 in related U.S. Appl. No. 12/905,194, David P. Goren, filed Oct. 15, 2010.

* cited by examiner

IMAGING READER AND METHOD WITH COMBINED IMAGE DATA AND SYSTEM DATA

DESCRIPTION OF THE RELATED ART

Solid-state imaging systems or imaging readers have been used, in both handheld and hands-free modes of operation, to capture images from diverse targets, such as symbols to be electro-optically decoded and read and/or non-symbols to be processed for storage and display. Symbols include one-dimensional bar code symbols, particularly of the Universal Product Code (UPC) symbology, each having a linear row of bars and spaces spaced apart along a scan direction, as well as two-dimensional symbols, such as Code 49, a symbology that introduced the concept of vertically stacking a plurality of rows of bar and space patterns in a single symbol, as described in U.S. Pat. No. 4,794,239. Another two-dimensional code symbology for increasing the amount of data that can be represented or stored on a given amount of surface area is known as PDF417 and is described in U.S. Pat. No. 5,304,786. Non-symbol targets can include any person, place or thing, e.g., a signature, whose image is desired to be captured by the imaging reader.

The imaging reader includes a solid-state imager having an array of photocells or light sensors that correspond to image elements or pixels in a two-dimensional field of view of the imager, an illuminating light assembly for uniformly illuminating the target with illumination light having a settable intensity level over a settable illumination time period, and an imaging lens assembly for capturing return illumination and/or ambient light scattered and/or reflected from the target being imaged, and for adjustably focusing the return light at a settable focal length onto the sensor array to initiate capture of an image of the target as pixel data over a settable exposure time period.

The imager may be a one- or two-dimensional charge coupled device (CCD) or a complementary metal oxide semiconductor (CMOS) device and includes associated circuits for converting the pixel data into image data or electrical signals corresponding to a one- or two-dimensional array of the pixel data at a settable gain over the field of view. The imager is analogous to the imager used in an electronic camera. An aiming light assembly is also typically mounted in the imaging reader, especially in the handheld mode, to help an operator accurately aim the reader at the target with an aiming light having a settable intensity level over a settable aiming time period.

The imager captures the return light under the control of a controller or programmed microprocessor that is operative for setting the various settable system parameters with system data, and for processing the electrical signals from the imager. When the target is a symbol, the controller is operative for processing and decoding the electrical signals into decoded information indicative of the symbol being imaged and read. When the target is a non-symbol, the controller is operative for processing the electrical signals into a processed image of the target, including, among other things, de-skewing the captured image, re-sampling the captured image to be of a desired size, enhancing the quality of the captured image, compressing the captured image, and transmitting the processed image to a local memory or a remote host.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

The imager is operatively connected to the controller via an image data bus or channel over which the image data is transmitted from the imager to the controller, as well as a system bus or channel over which the system data is bi-directionally transmitted between the imager and the controller. Such system data includes, among other things, control settings by which the controller sets one or more of the settable exposure time period for the imager, the settable gain for the imager, the settable focal length for the imaging lens assembly, the settable illumination time period for the illumination light, the settable intensity level for the illumination light, the settable aiming time period for the aiming light, the settable intensity level for the aiming light, as well as myriad other system functions, such as decode restrictions, de-skewing parameters, re-sampling parameters, enhancing parameters, data compression parameters and how often and when to transmit the processed image away from the controller, and so on.

As advantageous as such known imaging readers have been in capturing images of symbols and non-symbols and in decoding symbols into identifying information, the separate delivery of the image data over the image data bus and the system data over the system data bus from the imager to the controller made it difficult for the controller to associate the system data with its corresponding image data. This imposed an extra burden on the controller, which was already burdened with controlling operation of all the components of the imaging reader, as well as processing the image data for the target. It would be desirable to reduce the burden imposed on the controllers of such imaging readers and to enhance the responsiveness and reading performance of such imaging readers.

SUMMARY OF THE INVENTION

One feature of the present invention resides, briefly stated, in an imaging reader for, and a method of, imaging targets. The reader includes a solid-state imager supported by the reader and having an array of image sensors for capturing return light from a target over a field of view over a settable exposure time period, and for generating image data corresponding to the target. Preferably, the imager is a CCD or a CMOS chip having a settable gain with a rolling or a global shutter. The array may be one-dimensional, i.e., linear arranged along a single row, or two-dimensional having mutually orthogonal multiple rows and columns. The target may be a symbol having a plurality of elements of different light reflectivity, e.g., bars and spaces, and arranged in various symbologies. The target may be a non-symbol target, such as any person, place or thing whose image is desired to be captured by the imaging reader.

The reader may include an illuminating assembly for uniformly illuminating the target with illumination light having a settable intensity level over a settable illumination time period, and an imaging lens assembly for capturing return illumination and/or ambient light scattered and/or reflected from the target being imaged, and for adjustably focusing the return light at a settable focal length onto the sensor array to initiate capture of an image of the target as pixel data over a settable exposure time period. An aiming assembly is also typically mounted in the imaging reader, especially in the handheld mode, to help an operator accurately aim the reader at the target by emitting an aiming light having a settable intensity level over a settable aiming time period.

In accordance with an aspect of this invention, an application specific integrated circuit (ASIC) is operatively connected to the imager via an image data bus over which the image data is transmitted from the imager to the ASIC, and via a system bus over which system data for controlling operation of the reader is transmitted. The ASIC is operative for combining the image data and the system data to form combined data. A controller is operatively connected to the ASIC, for receiving and processing the combined data over a combined data bus from the ASIC, and for transmitting the processed image away from the controller to a local memory or a remote host. The controller processes the combined data by separating, and separately processing, the separated system data and the image data.

Such system data includes, among other things, control settings by which the controller and/or the ASIC sets one or more of the settable exposure time period for the imager, the settable gain for the imager, the settable focal length for the imaging lens assembly, the settable illumination time period for the illumination light, the settable intensity level for the illumination light, the settable aiming time period for the aiming light, the settable intensity level for the aiming light, as well as myriad other system functions, such as decode restrictions, de-skewing parameters, re-sampling parameters, enhancing parameters, data compression parameters, and how often and when to transmit the processed image away from the controller, and so on.

In the preferred embodiment, the system bus between the imager and the ASIC is bi-directional. The ASIC is operatively connected to the controller via the combined data bus over which the combined data is transmitted from the ASIC to the controller, and via another system bus over which the system data for controlling operation of the reader is transmitted between the ASIC and the controller. The other system bus between the ASIC and the controller is also bi-directional.

In one mode of operation, the ASIC forms the combined data by appending the system data to the image data. For example, in the case of a two-dimensional imager having multiple rows and columns, the image data is typically sequentially transmitted in a frame, either row-by-row or column-by-column. The system data could, for example, be appended to the image data as the last row, or the last column, or some other part, of a frame. In another mode of operation, the ASIC forms the combined data by overwriting the system data on part of the image data. The system data could, for example, be written over the last row, or the last column, or some other part, of a frame.

Hence, the system data associated with the image data is kept with the captured image, because the combined data arrives over a single bus in a single frame. There is no separate delivery of the image data over one bus and the system data over another bus from the imager to the controller. There is no extra burden on the controller as in the prior art, thereby enhancing the responsiveness and reading performance of such imaging readers.

In accordance with another aspect of this invention, the use of an external ASIC is eliminated. Instead, the above-described functionality of combining the image data and system data, as performed by the ASIC, is integrated onto the same integrated circuit silicon chip as the imager. These advanced imaging systems are typically called system-on-a-chip (SOC) imagers.

Another feature of the present invention resides in a method of imaging targets with an imaging reader. The method is performed by capturing return light from a target over a field of view of a solid-state imager having an array of image sensors, and generating image data corresponding to the target; operatively connecting an application specific integrated circuit (ASIC) to the imager via an image data bus over which the image data is transmitted from the imager to the ASIC, and via a system bus over which system data for controlling operation of the reader is transmitted, and combining the image data and the system data with the ASIC to form combined data; and receiving and processing the combined data from the ASIC at a controller operatively connected to the ASIC.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
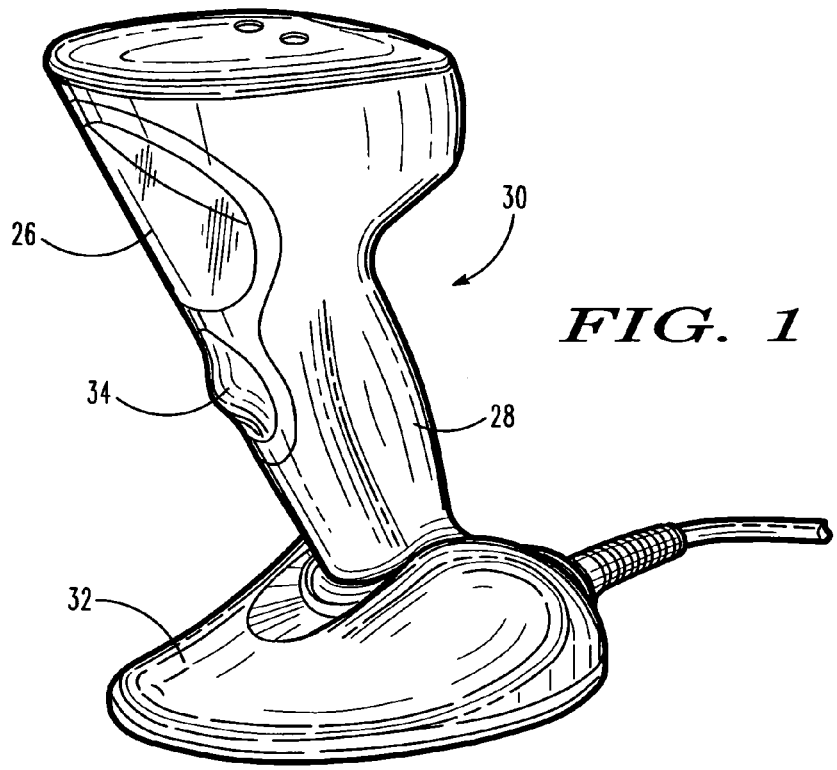
FIG. 1 is a perspective view of a portable imaging reader operative in either a handheld mode, or a hands-free mode, for capturing return light from targets.

Reference numeral 30 in FIG. 1 generally identifies an imaging reader having a generally upright window 26 and a gun-shaped housing 28 supported by a base 32 for supporting the imaging reader 30 on a countertop. The imaging reader 30 can thus be used in a hands-free mode as a stationary workstation in which targets are slid, swiped past, or presented to, the window 26, or can be picked up off the countertop and held in an operator's hand and used in a handheld mode in which the reader is moved, and a trigger 34 is manually depressed to initiate imaging of targets, especially one- or two-dimensional symbols, and/or non-symbols, located at, or at a distance from, the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
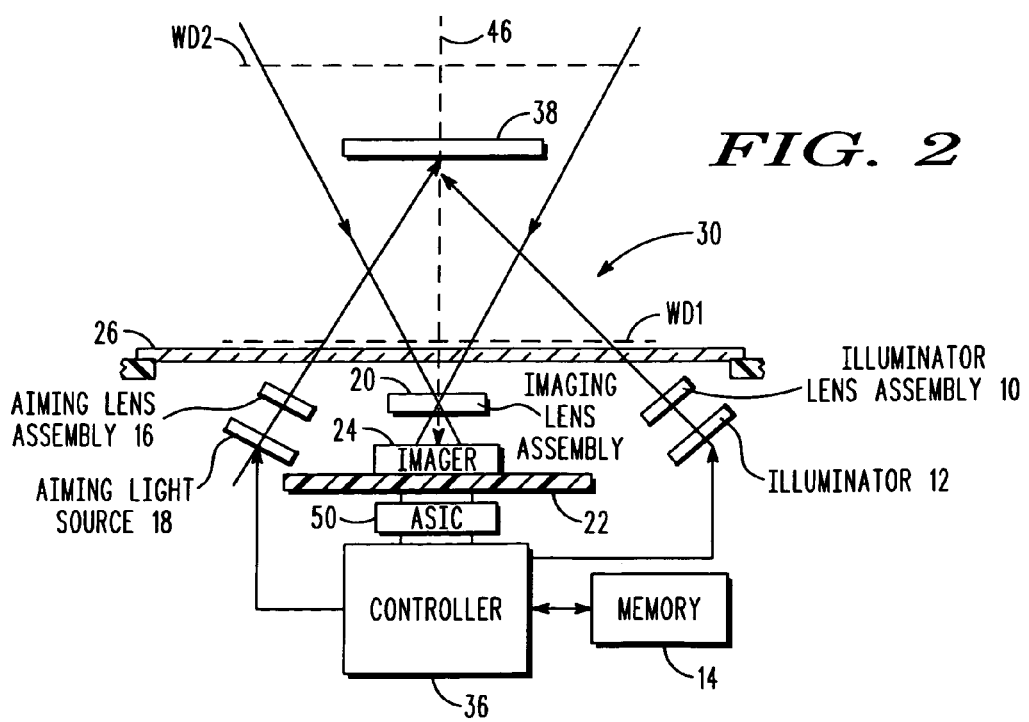
FIG. 2 is a schematic diagram of various components of the reader of FIG. 1 in accordance with this invention.

As schematically shown in FIG. 2, an imager 24 is mounted on a printed circuit board 22 in the reader. The imager 24 is a solid-state device, for example, a CCD or a CMOS imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from a target 38 as pixel data over a two-dimensional field of view. The imager 24 includes electrical circuitry having a settable gain for converting the pixel data to analog electrical signals, and a digitizer for digitizing the analog signals to digitized electrical signals or image data.

The imaging lens assembly 20 is operative for adjustably focusing the return light at a settable focal length onto the array of image sensors to enable the target 38 to be read. The target 38 is located anywhere in a working range of distances between a close-in working distance (WD1) and a far-out working distance (WD2). In a preferred embodiment, WD1 is about four to six inches from the imager 24, and WD2 can be many feet from the window 26, for example, around fifty feet away.

An illuminating assembly is also mounted in the imaging reader and preferably includes an illuminator or illuminating light source 12, e.g., a light emitting diode (LED) or a laser, and an illuminating lens assembly 10 to uniformly illuminate the target 38 with an illuminating light having a settable intensity level over a settable illumination time period. The light source 12 is preferably pulsed.

An aiming assembly is also preferably mounted in the imaging reader and preferably includes an aiming light source 18, e.g., an LED or a laser, for emitting an aiming light with a settable intensity level over a settable illumination time period, and an aiming lens assembly 16 for generating a visible aiming light pattern from the aiming light on the target 38. The aiming pattern is useful to help the operator accurately aim the reader at the target 38.

Figure 3:
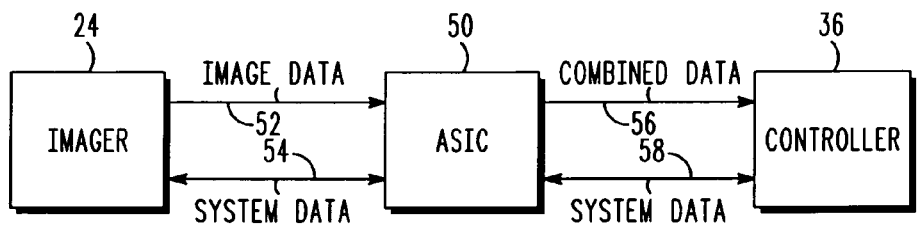
FIG. 3 is a schematic diagram depicting a dual channel communication between the imager, the ASIC and the controller of the reader components of FIG. 2.

As shown in FIG. 2, the illuminating light source 12 and the aiming light source 18 are operatively connected to a controller or programmed microprocessor 36 operative for controlling the operation of these components. The imager 24, as best seen in FIG. 3, is operatively connected to the controller 36 via an application specific integrated circuit (ASIC) 50. The ASIC 50 and/or the controller 36 control the imager 24. A local memory 14 is accessible by the controller 36 for storing and retrieving data.

In operation, the controller 36 sends a command signal to energize the aiming light source 18 prior to image capture, and also pulses the illuminating light source 12 for the illumination time period, say 500 microseconds or less, and energizes and exposes the imager 24 to collect light, e.g., illumination light and/or ambient light, from the target during an exposure time period. A typical array needs about 16-33 milliseconds to acquire the entire target image and operates at a frame rate of about 30-60 frames per second.

In accordance with an aspect of this invention, as shown in FIG. 3, the ASIC 50 is operatively connected to the imager 24 via an image data bus 52 over which the image data is transmitted from the imager 24 to the ASIC 50, and via a system bus 54 over which system data for controlling operation of the reader is transmitted. The system bus 54 is also sometimes referred to as the inter-integrated circuit bus, or by the acronym I2C. The ASIC 50 is operative for combining the image data and the system data to form combined data. The controller 36 is operatively connected to the ASIC 50, for receiving and processing the combined data over a combined data bus 56 from the ASIC 50, and for transmitting the processed image away from the controller 36 to the local memory 14 or a remote host. As described below in FIG. 5, the controller 36 processes the combined data by separating, and separately processing, the separated system data and the image data.

Such system data includes, among other things, control settings by which the controller 36 and/or the ASIC 50 sets one or more of the settable exposure time period for the imager 24, the settable gain for the imager 24, the settable focal length for the imaging lens assembly 20, the settable illumination time period for the illumination light, the settable intensity level for the illumination light, the settable aiming time period for the aiming light, the settable intensity level for the aiming light, as well as myriad other system functions, such as decode restrictions, de-skewing parameters, re-sampling parameters, enhancing parameters, data compression parameters, and how often and when to transmit the processed image away from the controller 36, and so on.

In the preferred embodiment, the system bus 54 between the imager 24 and the ASIC 50 is bi-directional. The ASIC 50 is operatively connected to the controller 36 via the combined data bus 56 over which the combined data is transmitted from the ASIC 50 to the controller 36, and via another system bus 58 over which the system data for controlling operation of the reader is transmitted between the ASIC 50 and the controller 36. The other system bus 58 between the ASIC 50 and the controller 36 is also bi-directional.

Figure 4:
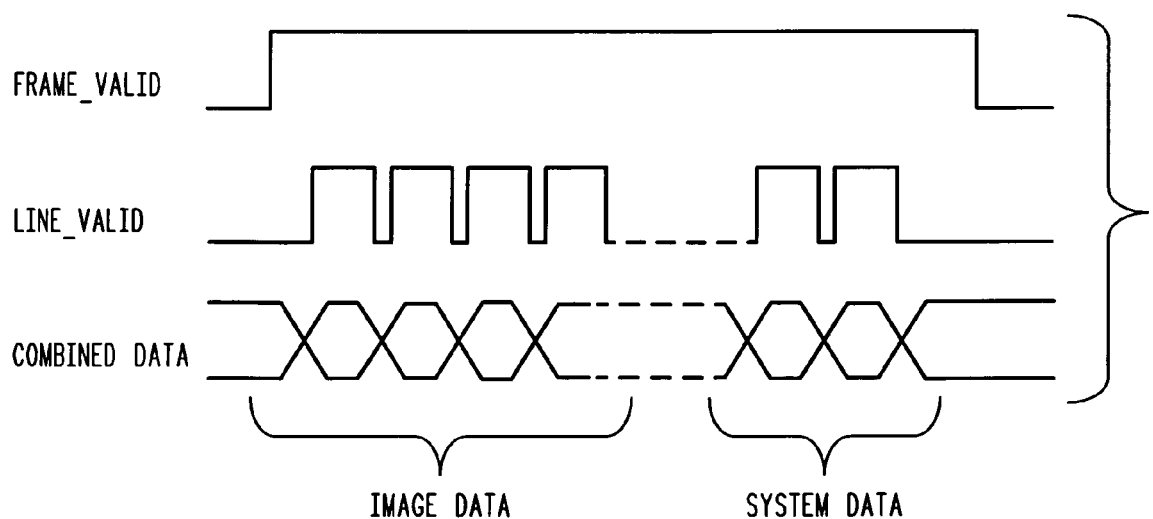
FIG. 4 is a series of signal timing waveforms depicting various signals, including a combined data signal, in the operation of the reader of FIG. 1.

In the case of a two-dimensional imager 24 having multiple rows and columns, the output image data is typically sequentially transmitted in a frame, either row-by-row or column-by-column. The FRAME_VALID waveform in FIG. 4 depicts a signal waveform of a frame. An image transfer from the ASIC 50 to the controller 36 is initiated when the FRAME_VALID waveform transitions from a low to a high state. The LINE_VALID waveform in FIG. 4 depicts a signal waveform of a row or a column in the frame. The COMBINED DATA waveform in FIG. 4 depicts a signal waveform of the combined data for one of the rows or columns in the frame.

In one mode of operation, the ASIC 50 forms the combined data by appending the system data to the image data. The system data could, for example, be appended, as shown in FIG. 4, to the image data as the last row, or the last column, or some other part, of a frame. In another mode of operation, the ASIC 50 forms the combined data by overwriting the system data on part of the image data. The system data could, for example, be written over the last row, or the last column, or some other part, of a frame. Another possibility is to add short additional frames containing only the system data.

For example, a megapixel imager 24 typically has 1024 rows with 1280 pixels or columns per row. Each pixel typically has 8-10 bits of information. Assuming 8 bits per pixel, appending an additional row of system data to the image data can transfer 1280 bytes of system data, which is now associated or combined with the image data in the current frame.

Figure 5:
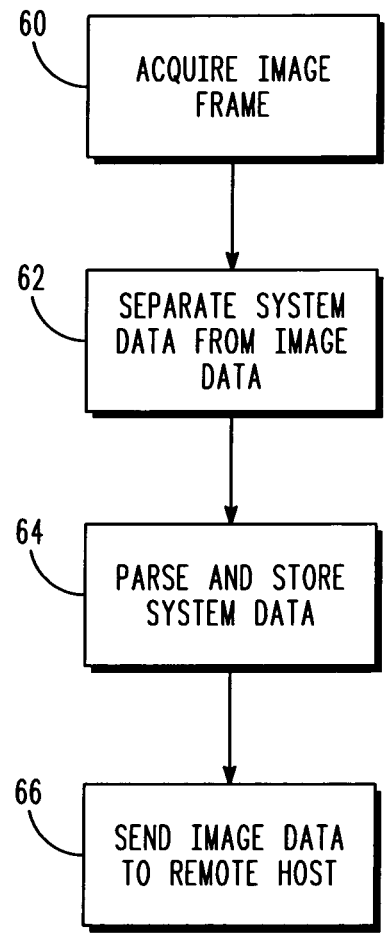
FIG. 5 is a flow chart depicting an aspect of the processing of the combined data signal of FIG. 4.

As shown in the flow chart of FIG. 5, after the image is acquired in step 60, the controller 36 separates the system data from the image data in step 62, parses and stores the system data in step 64, and processes, decodes and sends the image data away from the controller 36 to, for example, a remote host in step 66.

Hence, the system data associated with the image data is kept in synchronism with the captured image, because the combined data arrives over a single bus in a single frame. There is no separate delivery of the image data over one bus and the system data over another bus from the imager 24 to the controller 36. There is no extra burden on the controller 36 as in the prior art, thereby enhancing the responsiveness and reading performance of such imaging readers.

It will be understood that each of the elements described above, or two or more together, also may find a useful application in other types of constructions differing from the types described above. For example, the above-described use of an external ASIC can be eliminated. Instead, the above-described functionality of combining the image data and system data, as performed by the ASIC, can be integrated onto the same integrated circuit silicon chip as the imager. These advanced imaging systems are typically called system-on-a-chip (SOC) imagers.

While the invention has been illustrated and described as an imaging reader and method with combined image data and system data, it is not intended to be limited to the details shown, since various modifications and structural changes may be made without departing in any way from the spirit of the present invention. For example, this invention is not to be limited solely to imaging readers whose only function is to image bar code symbols, but could equally apply to mobile computers or terminals having an imager 24 as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging reader for imaging targets, comprising:
   a solid-state imager supported by the reader and having an array of image sensors for capturing return light from a target over a field of view, and for generating image data corresponding to the target;
   an application specific integrated circuit (ASIC) operatively connected to the imager via an image data bus over which the image data is transmitted from the imager to the ASIC, and via a system bus over which system data for controlling operation of the reader is transmitted, the ASIC being operative for combining the image data and the system data to form combined data in one frame;
   a controller operatively connected to the ASIC, for receiving the combined data in one frame when a signal received by the controller indicates that the one frame is valid, and for processing the combined data from the ASIC; and
   wherein the system data includes at least one of (1) data specifying an exposure time period for the imager, (2) data specifying a gain for the imager, (3) data specifying a focal length for an imaging lens assembly, (4) data specifying an illumination time period for the illumination light, (5) data specifying an intensity level for an illumination light, (6) data specifying an aiming time period for an aiming light, (7) data specifying an intensity level for an aiming light, and (8) data specifying a decode restriction.

2. The reader of claim 1, wherein at least one of the controller and the ASIC is operative for determining the system data.

3. The reader of claim 1, wherein the system bus between the imager and the ASIC is bi-directional.

4. The reader of claim 1, wherein the ASIC is operatively connected to the controller via a combined data bus over which the combined data is transmitted from the ASIC to the controller, and via another system bus over which the system data for controlling operation of the reader is transmitted between the ASIC and the controller.

5. The reader of claim 4, wherein the other system bus between the ASIC and the controller is bi-directional.

6. The reader of claim 1, wherein the ASIC forms the combined data by appending the system data to the image data.

7. The reader of claim 1, wherein the ASIC forms the combined data by overwriting the system data on part of the image data.

8. The reader of claim 1, wherein the controller processes the combined data by separating, and separately processing, the system data and the image data.

9. The reader of claim 1, wherein the system data further includes at least one of a de-skewing parameter, a re-sampling parameter, an enhancing parameter, and a data compression parameter.

10. An imaging reader for imaging targets, comprising:
    an imaging system having a solid-state imager supported by the reader and having an array of image sensors for capturing return light from a target over a field of view, and for generating image data corresponding to the target, the imaging system being operative for combining the image data and system data for controlling operation of the reader to form combined data in one frame;
    a controller operatively connected to the imaging system, for receiving the combined data in one frame when a signal received by the controller indicates that the one frame is valid, and for processing the combined data from the imaging system; and
    wherein the system data includes at least one of (1) data specifying an exposure time period for the imager, (2) data specifying a gain for the imager, (3) data specifying a focal length for an imaging lens assembly, (4) data specifying an illumination time period for the illumination light, (5) data specifying an intensity level for an illumination light, (6) data specifying an aiming time period for an aiming light, (7) data specifying an intensity level for an aiming light, and (8) data specifying a decode restriction.

11. A method of imaging targets with an imaging reader, comprising the steps of:
    capturing return light from a target over a field of view of a solid-state imager having an array of image sensors, and generating image data corresponding to the target;
    operatively connecting an application specific integrated circuit (ASIC) to the imager via an image data bus over which the image data is transmitted from the imager to the ASIC, and via a system bus over which system data for controlling operation of the reader is transmitted, and combining the image data and the system data with the ASIC to form combined data in one frame;
    receiving the combined data in one frame when a signal received by the controller indicates that the one frame is valid;
    processing the combined data from the ASIC at a controller operatively connected to the ASIC; and
    wherein the system data includes at least one of (1) data specifying an exposure time period for the imager, (2) data specifying a gain for the imager, (3) data specifying a focal length for an imaging lens assembly, (4) data specifying an illumination time period for the illumination light, (5) data specifying an intensity level for an illumination light, (6) data specifying an aiming time period for an aiming light, (7) data specifying an intensity level for an aiming light, and (8) data specifying a decode restriction.

12. The method of claim 11, and a step of determining the system data by at least one of the controller and the ASIC.

13. The method of claim 11, and a step of configuring the system bus between the imager and the ASIC to be bi-directional.

14. The method of claim 11, and a step of operatively connecting the ASIC to the controller via a combined data bus over which the combined data is transmitted from the ASIC to the controller, and via another system bus over which the system data for controlling operation of the reader is transmitted between the ASIC and the controller.

15. The method of claim 14, and a step of configuring the other system bus between the ASIC and the controller to be bi-directional.

16. The method of claim 11, wherein the step of forming the combined data is performed by appending the system data to the image data.

17. The method of claim 11, wherein the step of forming the combined data is performed by overwriting the system data on part of the image data.

18. The method of claim 11, wherein the step of processing the combined data is performed by separating, and separately processing, the system data and the image data.

19. The method of claim 11, wherein the system data further includes at least one of a de-skewing parameter, a re-sampling parameter, an enhancing parameter, and a data compression parameter.

* * * * *